United States Patent [19]

Nagai

[11] Patent Number: 4,841,553
[45] Date of Patent: Jun. 20, 1989

[54] METHOD OF AND APPARATUS FOR CARRYING OUT TOMOGRAPHY

[75] Inventor: Hideo Nagai, Tokyo, Japan

[73] Assignee: Yokogawa Medical Systems, Limited, Tokyo, Japan

[21] Appl. No.: 57,970

[22] PCT Filed: Sep. 27, 1986

[86] PCT No.: PCT/JP86/00496
 § 371 Date: May 19, 1987
 § 102(e) Date: May 19, 1987

[87] PCT Pub. No.: WO87/02158
 PCT Pub. Date: Apr. 9, 1987

[30] Foreign Application Priority Data

Sep. 30, 1985 [JP] Japan ................... 60-216778

[51] Int. Cl.$^4$ ............................................. G06F 15/42
[52] U.S. Cl. .......................................... 378/19; 378/4; 378/901; 364/413.18
[58] Field of Search .............................. 378/19, 4, 901; 364/414

[56] References Cited

U.S. PATENT DOCUMENTS

| | | | |
|---|---|---|---|
| 4,051,379 | 9/1977 | Zacher | 378/19 |
| 4,126,787 | 11/1978 | Hounsfield | 378/901 |
| 4,280,178 | 7/1981 | Nassi et al. | 378/901 |
| 4,284,896 | 8/1981 | Stonestrom | 378/901 |
| 4,637,040 | 1/1987 | Sohval et al. | 387/19 |
| 4,707,822 | 11/1987 | Hopkinson et al. | 378/901 |

FOREIGN PATENT DOCUMENTS 59-77836 5/1984 Japan .

OTHER PUBLICATIONS

Saito, *Computer Tomography Device*, (Translation of Japanese Patent 59-77836), USPTO, Aug. 1987, 7 pages.

Primary Examiner—Carolyn E. Fields
Assistant Examiner—David P. Porta
Attorney, Agent, or Firm—Moonray Kojima

[57] ABSTRACT

The present invention provides an apparatus for carrying out tomography which is arranged in such a manner that a radiation source and a multichannel radiation detector are rotated about a subject to be examined, the radiation source disposed so as to generate a fan beam of radiant rays such as X-rays, the multichannel radiation detector having an offset arrangement and disposed in opposition to the radiation source with the subject being interposed therebetween; the fan beam of radiant rays being applied in the direction parallel with a chosen section of the subject; the chosen section of the subject being measured in a plurality of directions parallel therewith so as to obtain data representative of the distribution of the intensity of transmitted radiant beams; and an image of the section of the subject being thereby reconstructed on the basis of data having an array corresponding to the fan beam. Data to be inserted is obtained from measurement data in opposition to the measurement data relative to the respective directions, and is inserted into the same measurement data. An image of the section of the subject is reconstructed on the basis of the increased measurement data obtained from this insertion, thereby realizing an improvement in the quality and resolution of a reconstructed image of body organs or the like.

3 Claims, 6 Drawing Sheets

METHOD OF AND APPARATUS FOR CARRYING OUT TOMOGRAPHY

TECHNICAL FIELD

The present invention relates to an improvement in a method of and an apparatus for carrying out tomography with the use of a fan beam of radiant rays, and more particularly to an improvement in the quality and resolution of a reconstructed graphical display of body organs or the like.

BACKGROUND ART

An apparatus for carrying out tomography is typically arranged in such a manner that a radiation source and a multichannel radiation detector is rotated about a subject to be examined, the radiation source disposed so as to generate a fan beam of radiant rays such as X-rays, the multichannel radiation detector disposed in opposition to the radiation source with the subject being interposed therebetween, the fan beam of radiant rays being applied in the direction parallel with a chosen section of the subject, the chosen section of the subject being measured in a plurality of directions parallel therewith so as to obtain data representative of the distribution of the intensity of transmitted radiant beams, and an image of the section of the subject being thereby/reconstructed on the basis of the data. In such an apparatus, in general, in order to enhance the resolution of the thus-reproduced image and/or reduce the occurrence of an artifact derived from aliasing or the like, the radiation detector is disposed so that a radiant ray passing through the axis of the rotation may be made incident upon a channel of the radiation detector at a point offset by an amount less than half of one channel width from the center of the channel (hereinafter referred to as "offset arrangement"). An image representing the section of the subject is reconstructed on the basis of the data obtained from the thus-arranged radiation detector. Typically, a quarter of channel width is selected as such an offset amount.

In this case, the acquired data has an array corresponding to the form of the fan beam of radiant rays. The/reconstruction of the sectional image of the subject may be performed directly through this data array or after the data array has been converted to another data array corresponding to the form of a parallel beam of radiant rays.

Also, the specification of Japanese Patent Laid-open No. 206729/1983 describes a further improvement in the arrangement of the type in which an image is/reconstructed after the array of acquired data has been converted to a data array corresponding to a parallel beam of radiant rays. In the arrangement described in this specification, a processing such as convolution, filtering or the like is performed each time data corresponding to a parallel beam in a different direction is obtained. Subsequently, after a set of the processed data relating to the parallel beams in all directions has been prepared, pieces of data provided by beams which are shifted by a half channel width and the directions of which are opposite to each other are alternately arranged in an inserted manner. Thus, a processing such as back projection is effected on the basis of a set of the inserted data.

In a case where the/reconstruction of an image is to be performed directly through the data having an array corresponding to the fan beam of radiant rays, the effect of offset arrangement of the radiation detector is not necessarily be fully utilized from the viewpoints of an improvement in the resolution of the/reconstructed image and/or a reduction in the occurrence of an artifact derived from aliasing or the like. In contrast, in a case where the reproduction of an image is to be performed from an ideal parallel beam of radiant rays, the effect of offset arrangement of the radiation detector is fully realized. However, if a fan beam of radiant rays is to be converted to a parallel beam of radiant rays, a further arithmetic operation is required to effect conversion of the data array. In addition, this conversion involves a lowering of the quality of a/reconstructed image, a deterioration of the resolution or the occurrence of an artifact. The apparatus described in the aforesaid specification laid open to a public inspection has a further problem in that it provides no substantial effect of reducing the occurrence of an artifact.

DISCLOSURE OF THE INVENTION

It is therefore an object of the present invention to provide a method of and an apparatus for effecting tomography in which, when the/reconstruction of an image is to be performed directly through data having an array corresponding to a fan beam of radiant rays, the effect of offset arrangement of a radiation detector is fully utilized from the viewpoints of an improvement in the resolution of a reconstructed image and/or a reduction in the occurrence of an artifact derived from aliasing or the like and which succeeds in remarkably reducing various kinds of artifact such as an aliasing artifact which might become a critical problem relative to the imaging or body organs or the like, thereby enabling-/reconstruction of an image with high resolution, high quality and high fidelity.

The aforesaid object is achieved by the present invention providing an apparatus for effecting tomography which is arranged in such a manner that a radiation source and a multichannel radiation detector are rotated about a subject to be examined, the radiation source disposed so as to generate a fan beam of radiant rays such as X-rays, the multichannel radiation detector having an offset arrangement and disposed in opposition to the radiation source with the subject being interposed therebetween; the fan beam of radiant rays being applied in the direction parallel with a chosen section of the subject; the chosen section of the subject being measured in a plurality of directions parallel therewith so as to obtain data representative of the distribution of the intensity of transmitted radiant beams; and an image of the section of the subject being thereby reconstructed on the basis of data having an array corresponding to the fan beam. In such an apparatus, a set of data to be inserted is obtained from a set of measurement data obtained in opposition to a set of measurement data relative to the respective directions, and the respective pieces of the set of data to be inserted are inserted into the aforementioned set of measurement data prior to convolution or filtering. Thus, an image of the section of the subject is/reconstructed on the basis of the increased measurement data obtained in this way.

BEST MODE FOR CARRYING OUT THE INVENTION

Figure 1:
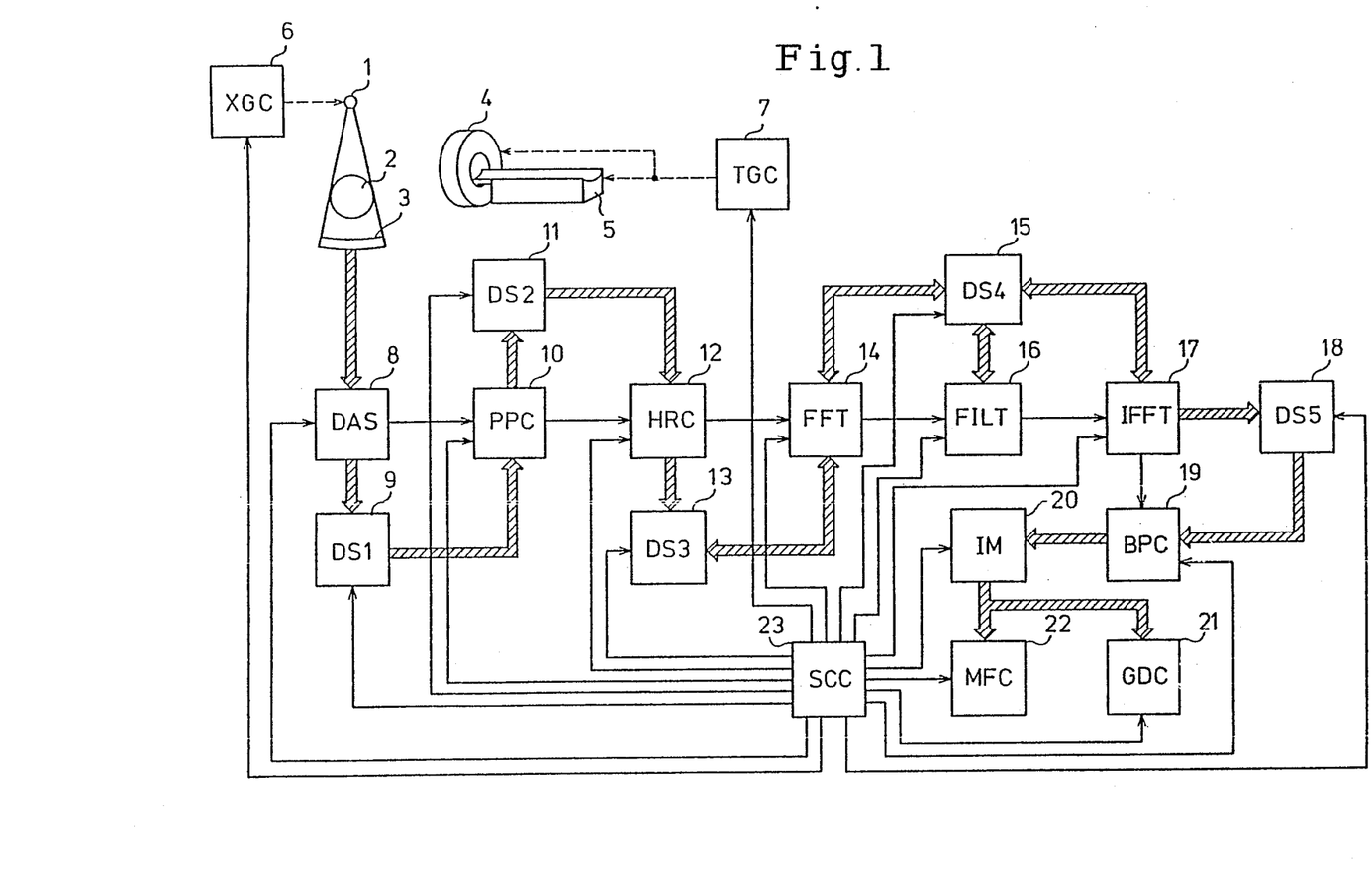
FIG. 1 is a diagrammatic view of a preferred embodiment of the present invention.

FIG. 1 is a diagrammatic view of the construction of the embodiment of the present invention. As shown in FIG. 1, a fan beam of radiant rays generated from a radiation source 1 is passed through a subject 2 to be examined and is made incident upon a multichannel radiation detector 3. In practice, the radiation source 1 and the multichannel radiation detector 3 (hereinafter referred to simply as a "radiation detector") are disposed on a gantry 4 and are capable of being rotated about the subject 2 while maintaining a positional relationship which will be described later. In practice, the subject 2 is placed on a table 5, and a desired section of the subject 2 is positioned in such a manner as to be stopped in a space across which the radiation source 1 faces the radiation detector 3. The generation of radiant rays by the radiation source 1 is controlled by a radiation source controller 6, and the rotation of the gantry 4 and the feed of the subject 2 by the table 5 are controlled y a table/gantry controller 7.

The signal output from the radiation detector 3 is acquired by a data acquiring device 8, being converted to a digital signal, and being stored in a storage device 9. The acquired data stored in the storage device 9 is subjected to a predetermined preprocessing by a preprocessor 10, and is stored in a storage device 11. There are some kinds of preprocessing such as the correction of radiation intensity, the correction of the sensitivity of each channel of the radiation detector 3, and beam harding correction used when the radiant rays employed are X-rays. The preprocessed data stored in the storage device 11 is processed as described later in detail by a data generating/increasing device 12 constituting a feature of the present invention, and is stored in a storage device 13. The processed data stored in the storage device 13 is subjected to a Fourier transform by a Fourier transformer 14, and is stored in a storage device 15. The data subjected to the Fourier transform and stored in the storage device 15 is filtered by a filter 16. The thus-filtered data is subjected to an inverse Fourier transform by an inverse Fourier transformer 17, and is stored in a storage device 18. The data stored in the storage data 18 is subjected to an back projection processing by a back projection device 19, and is stored in an image data storage device 20. The image data stored in the storage device 20 is displayed as a graphic image by an image display controller 21, and the image data is photographed by a photographing device 22 as required. A photography controller 23 controls the operations of all the aforesaid devices. In this embodiment of the present invention, the operations of the majority of the devices are realized by the function of a computer. All the devices other than the data generating/increasing device 12 respectively have constructions and functions generally common to those of the devices used in a known type of tomograph.

Figure 2:
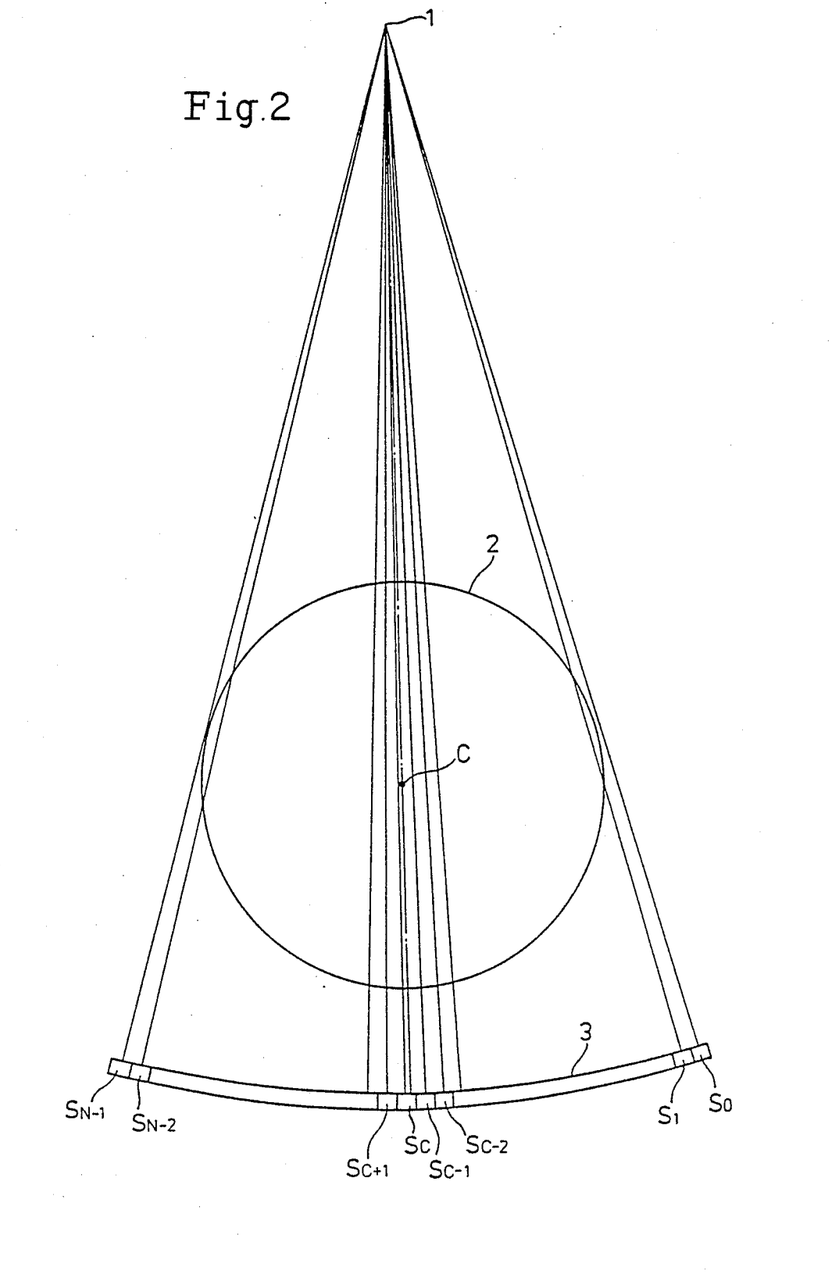
FIG. 2 is a diagram used as an aid in explaining the offset arrangement of a radiation detector in accordance with the present invention.

The positional relationship between the radiation source 1 and the radiation detector 3 is, for example, as shown in FIG. 2. Specifically, the radiation detector 3 is arranged in such a manner that its central channel $S_c$ is located at a position shifted by a quarter of a channel width from the axis of the radiant beam passing through a rotational center C of the gantry 4 (hereinafter referred to as "central beam").

A number i is assigned to each of the channels of the radiation detector 3 in sequence from a channel positioned at its one end. The directions of the respective channels with respect to the focal point of the radiation source 1 are represented by an angle $\gamma$ with reference to the axis of the central beam, and the difference in angle between the respective channels (hereinafter referred to as "channel pitch") is represented by $\Delta\gamma$. It is to be noted that, for the sake of convenience of the following explanation, $-0.5$ is assigned to a first channel, the channel number 1 being incremented by one from this setting.

A plurality of directions in which a desired section of the subject is measured so as to obtain data concerning transmitted radiant rays are defined by dividing the rotary orbit of the radiation source 1 about the subject 2 by an equal angle. The direction in which measurement is made so as to obtain data corresponding to transmitted radiant rays is referred to as "view", and the angle difference between two adjacent views is referred to as a "view pitch". The direction of each view is represented by an angle $\theta$ to the central beam, and the view pitch is represented by $\Delta\theta$. Each view is numbered with reference to a given view.

Figure 3:
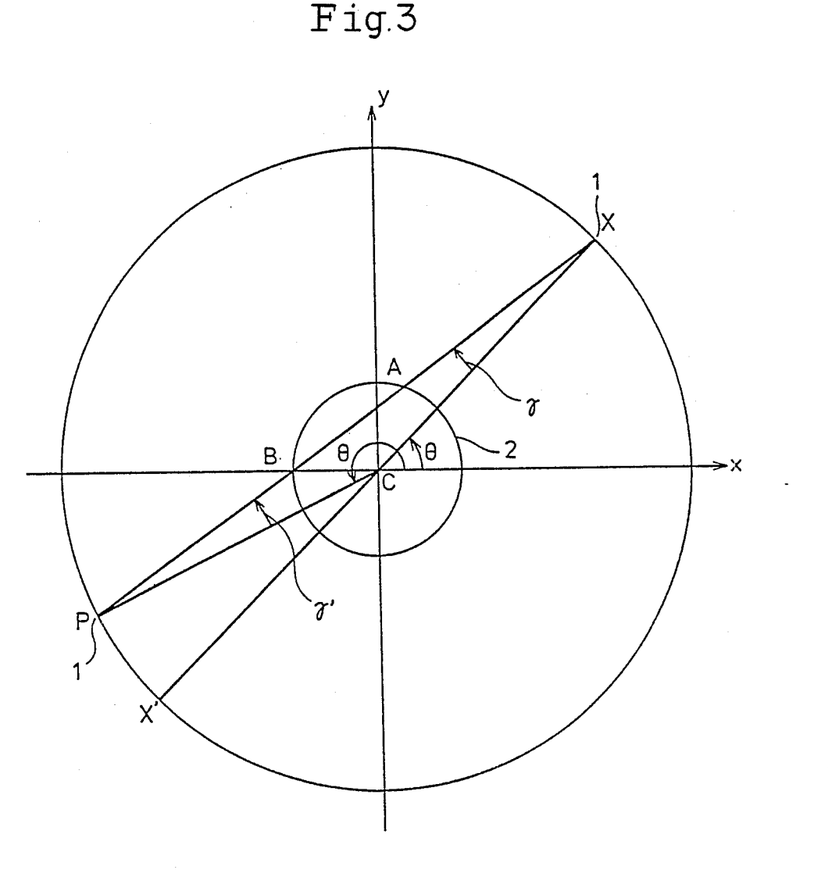
FIG. 3 is a chart showing the geometrical relationship in measurement performed in obtaining opposite data.

FIG. 3 shows the geometrical relationship in a measurement system used in obtaining data concerning transmitted radiant rays at a certain view. It is assumed here that V represents the view number, $\theta$ representing the view angle, X representing the position of the radiation source 1, and measurement being made with respect to data relative to the radiant rays transmitted through a portion AB of the subject 2 at a channel i of the radiation detector existing in the direction corresponding to an angle $\gamma$. If V' represents the view number, $\theta'$ the view angle and P the position of the radiation source 1, the data corresponding to this measurement is obtained at a channel i' of the radiation detector located in the direction corresponding to an angle $\gamma'$.

In this case, the following relationship is established:

$$\gamma' = \gamma \quad (1)$$

$$\theta' = \theta + \pi - 2\gamma \quad (2)$$

$$\gamma' = (cc - i')\Delta\gamma \quad (3)$$

$$\gamma = (i - cc)\Delta\gamma \quad (4)$$

$$\theta' = v' \cdot \Delta\theta \quad (5) \text{ and}$$

$$\theta = V \cdot \Delta\theta \quad (6)$$

where cc represents the position at which the central beam strikes the radiation detector 3 and which is represented by a channel number inclusive of the amount of shift of the radiation detector; for example, in the case of channel 511 of the radiation detector 3, cc=254.75 is obtained. From the equations (1), (3) and (4), we have:

$$i' = 2 \cdot cc - i \quad (7)$$

Also, from the equations (2), (5) and (6), we have:

$$v' = V + \pi/\Delta\theta - 2(i-cc)\Delta\gamma/\Delta\theta \quad (8)$$

In other words, data corresponding to the data relative to channel i at view V is obtained through channel i' at view v'. Data having such relationship is referred to as "opposite data".

Figure 4:
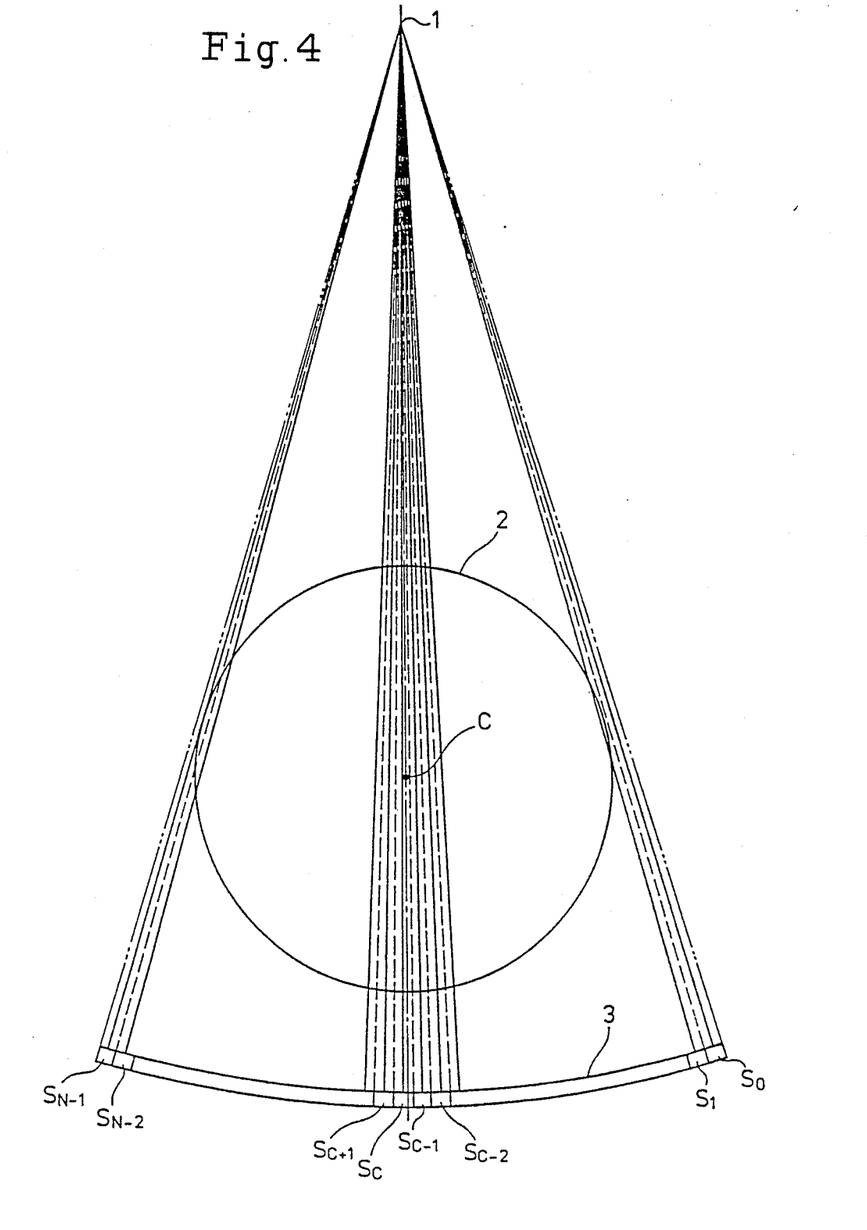
FIG. 4 is a diagram showing the conception of data measurement performed in the preferred embodiment of the present invention.

In this case, actually, since the radiation detector is arranged in such a manner as to be shifted by a quarter of a channel width, the radiant rays which provide such opposite data are shifted by half of a channel width. Therefore, the data provided at channel i' of view v' is one corresponding to the midpoint between channel i and channel i+1 (or i−1) of view V. When data at channels i' of view v' having opposite relationship with data at all channels i of view V is obtained, if each piece of the data at channels i' of view v' is inserted between the respective adjacent pieces of the data at channels i of view V, it is, as shown in FIG. 4, possible to obtain measurement data equivalent to that provided when measuring the radiant rays transmitted through the subject 2, at half of a channel pitch of the radiation detector 3.

Thus, sampling density with respect to measurement data is doubled and the quantity of measurement data obtained is also doubled. Therefore, if the/reconstruction of an image is performed on the basis of the thus-obtained measurement data, it is possible to obtain an image with high resolution, and also the occurrence of artifacts can be fundamentally prevented as described later.

It is to be noted that, in addition to the method based on the utilization of the opposite data provided by the radiation detector having the offset arrangement, there is another method in which the quantity of measurement data is apparently doubled by obtaining data corresponding to each portion between adjacent channels through interpolation only from data in the same direction. In such a method, however, the original number of sampling points of the data is not changed, so that the quantity of measurement data is not substantially increased. In contrast, the present invention is characterized in that measurement data having its sampling points between the respective channels is really obtained from measurement in an opposite direction by means of the radiation detector having the offset arrangement.

However, since v' in the equation (8) is not necessarily an integer, sampled data does not necessarily exist at channels i' of view v' in opposition to the data at all the channels i of view V. For this reason, data is calculated from sampled data at a channel of a certain view present in the vicinity of channel i' of view v', and the thus-calculated data is inserted into the original data. The data on which this calculation is based might not be shifted exactly by half of a channel width, but is certain to have its sampling points between the respective channels providing the original data into which the calculated data is inserted.

Such calculation and insertion are performed by the data generating/increasing device 12 shown in FIG. 1. In practice, the data generating/increasing device 12 is constituted by means for generating data to be inserted and means for increasing measurement data by inserting the generated data into the measurement data. The data generating/increasing device 12 calculates view v' and channel i' which should include opposite data with respect to the data at channel 1 of view V from the aforesaid equations (7) and (8), and finds out view V' and channel I' which do not exceed but are closest to view v' and channel i, respectively, from among the existing views and channels. Thus, opposite data is obtained from the following equation on the basis of data $a_{I'}(V')$ provided at channel I' of view V' and data $a_{I'}(V'+1)$ provided at channel I' of view $(V'+1)$:

$$b_i(V) = (1 - v' + V') \cdot a_{I'}(V' + 1) \quad (9)$$

It is to be noted that, if the value of v' calculated from the equation (8) is negative or in excess of the maximum value $V_M$ of the view number, it is preferred for the maximum value $V_M$ of the view number to be added to or subtracted from v' so that the value of v' may be in a range of 0 to $(V_M - 1)$. This calculation is based on the fact that, if the radiation source makes full rotation, the view number is returned to its starting value.

The equation (9) is an equation representative of linear interpolation based on data at a certain view present nearest and before or after view v'. It is to be noted that an interpolation calculation concerning data $b_i(V)$ to be inserted may be performed utilizing not only two pieces of data across channel i' of view v' but also a plurality of pieces of data greater than two in number. In any case, it is possible to calculate data to be inserted by a simple interpolation operation.

The data generating/increasing device 12 is arranged to insert each piece of the thus obtained data $b_i(V)$ into the respective pieces of data $a_i(V)$ of view V, thereby generating measurement data of view V equivalent to the data obtained by measurement performed at half of the channel pitch of the radiation detector 3.

Figure 5:
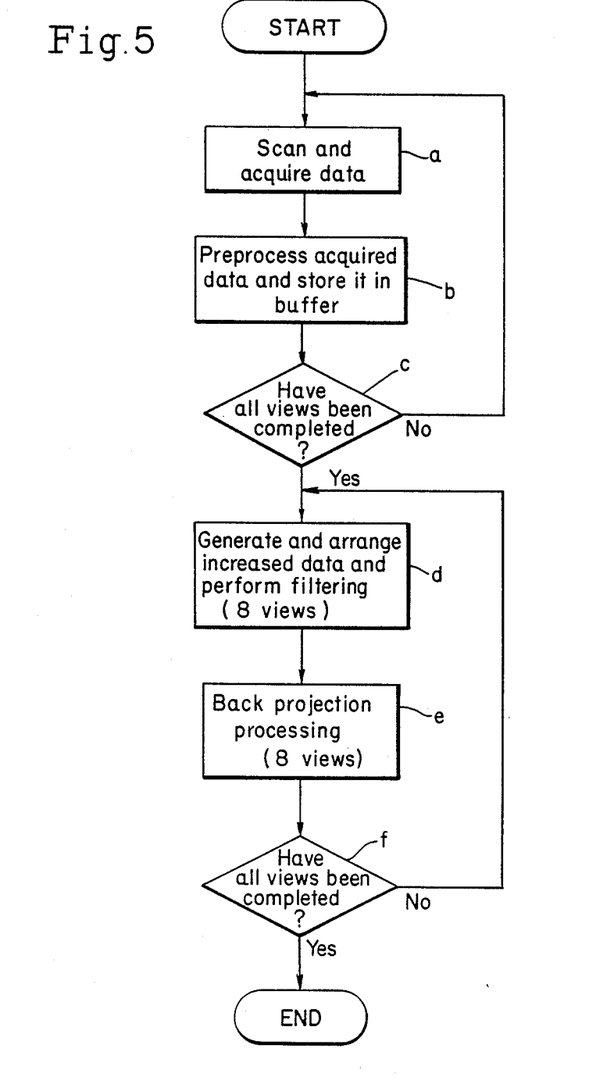
FIG. 5 is a flow chart of the operations of the preferred embodiment of the present invention.

FIG. 5 is a flow chart showing the operations of the embodiment of the present invention inclusive of such formation of measurement data. In FIG. 5, the operation of the data generating/increasing device 12 is included in a processing block d.

In operation, if the sampling pitch of measurement data is halved and the sampling density is doubled, the image based on the measurement data is reconstructed with high resolution. Also, if the sampling pitch of measurement data is halved and the sampling density is doubled, a Nyquist frequency used in measuring a spatial frequency is doubled. As is well known, if measurement data contains a spatial frequency component exceeding the Nyquist frequency, the component is superimposed on a frequency range lower than the Nyquist frequency owing to aliasing, thereby generating an artifact based on the superimposition. However, if the Nyquist frequency is doubled, the frequency components of measured signals exceeding the Nyquist frequency is greatly reduced, so that the occurrence of an artifact caused by aliasing is greatly reduced.

Also, in order to improve the resolution of a reconstructed image, measurement data may be subjected to spatial-frequency multiplication prior to convolution or filtering. In this case, the frequency component in a frequency range lower than the Nyquist frequency is superimposed on that in a frequency range higher than the Nyquist frequency, thereby producing an artifact. However, if the Nyquist frequency is doubled, such superimposition is performed with reference to the enhanced Nyquist frequency. Therefore, the frequency range which includes the lower frequency component to be superimposed is transferred to a range exceeding the frequency range in which a reconstructed image is/displayed, and thus does not cause the occurrence of an artifact.

Figure 6A:
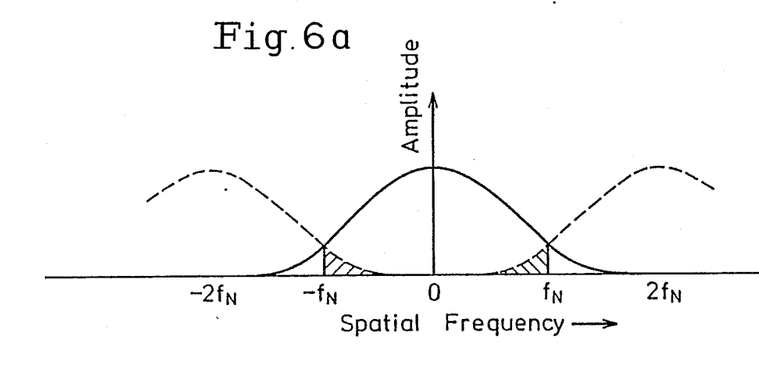
FIGS. 6a and 6b are graphs respectively showing the artifact reduction effect provided by the preferred embodiment of the present invention.
Figure 6B:
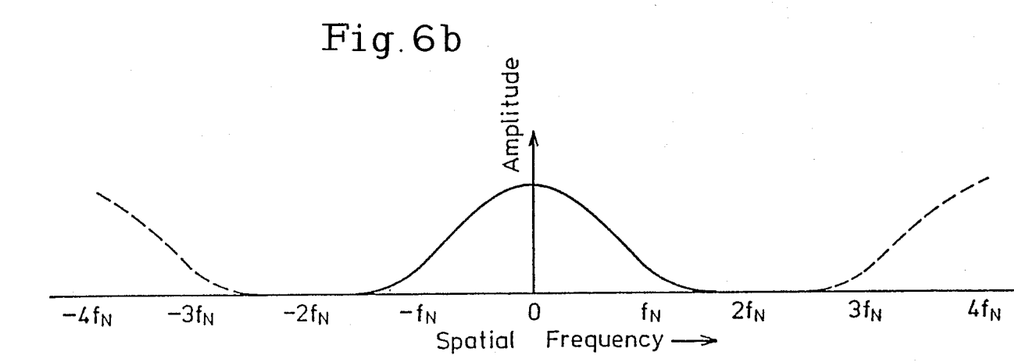

FIGS. 6a and 6b shows the aforesaid state. These Figures conceptually show a part of the real-number portions of the frequency spectrum of sampled data. FIG. 6a shows a case where the Nyquist frequency is $f_N$. As shown, in a case where the spatial frequency component of a measured signal exceeds the Nyquist frequency $f_N$, superimposition toward the lower frequency range takes place as shown by portions in which slanting lines are drawn in FIG. 6a. Also, in a case where a spatial frequency is multiplied, the lower frequency range, as shown by a broken line, is superimposed on the higher frequency range. Either of these cases might cause occurrence of an artifact. In contrast, FIG. 6b shows a case where the Nyquist frequency is $2f_N$. When it is assumed that a measured signal contains the same frequency component as that shown in FIG. 6a, the number of the spatial frequency components of the measured signal exceeding the Nyquist frequency is small or negligible. Therefore, superimposition on the lower frequency range is slight or may be ignored, and the superimposition is remarkably reduced as compared with that of FIG. 6a. Also, the superimposition of the lower frequency component on the higher frequency range takes place out of the frequency range used in displaying a reconstructed image which is normally selected below $2f_N$.

Since the sampling pitch of measurement data is halved, the sampling density being doubled and the quantity of sampled data being doubled, interpolation data can be further precisely calculated. Therefore, in a case where an extremely small portion with high contrast is to be measured, it is possible to reduce an artifact which might previously have been produced owing to an unsuitable interpolation.

The three artifact reduction effects described above enable a remarkable reduction in the occurrence of various kinds of artifact on a reconstructed image such as a linear artifact, a tangential artifact, an arcuate artifact, a moire-like artifact and a streaky artifact.

Incidentally, in the method set forth in the previously mentioned Japanese Patent Laid-open specification, pieces of opposite data based on parallel beams shifted by half of a channel width are alternately arranged in an inserted manner after filtering or convolution for obtaining a parallel beam, though. It seems that the method has a point common to a feature of the present invention. However, even if insertion of data/shifted by half of a channel width is performed after filtering or convolution, this does not mean that the sampling pitch of a measured signal is halved so that sampling may be performed at two-fold density. Also, if data used for back projection is inserted in this manner, it becomes impossible to realize a typical advantage of a parallel-beam/reconstruction method in which an aliasing artifact produced in a certain direction is cancelled by an artifact produced in a 180° opposite direction with respect to all the directions and paths of the radiant beams. Therefore, the method described in the previously-described Laid-open specification cannot provide the artifact reduction effect realized in accordance with the present invention. In addition, the conversion of a fan beam of radiant rays into a parallel beam of radiant rays cannot avoid a lowering of image quality, the deterioration of the resolution, the occurrence of an artifact and the like.

The foregoing description refers to one embodiment of the present invention by way of example, but the offset amount of the radiation source 3 is not necessarily limited solely to a quarter of a channel width. A given offset amount may be selected within half of a channel width from the center of the channel. Also, the data generating/increasing processing need not necessarily be performed subsequently to the preprocessing, and may be effected, for example, prior to or in the course of the preprocessing. In addition, data to be inserted need not necessarily be obtained in opposition to all pieces of data which undergoes data insertion. It is also preferable to obtain only data relative to the substantial portion of an image to be reproduced.

Also, a filtered back projection method, a convolution method, a Fourier method or the like is applicable to algorithm used in/reconstructing an image. Of course, various modifications may be employed in the arrangement and the operation of the apparatus for effecting tomography in accordance with the present invention.

As described above, in accordance with the present invention, in a case where the/reconstruction of an image is performed directly through data having an array corresponding to a fan beam of radiant rays, the effect of offset arrangement of the radiation detector is fully realized from the viewpoints of an improvement in the resolution of the /reconstructed image and/or a reduction in the occurrence of an artifact, and it is possible to remarkably reduce the occurrence of various artifacts which might be produced due to the complicate configuration of body organs or the like, thereby achieving an apparatus for effecting tomography capable of realizing a/reconstructed image with high resolution, high quality and high fidelity.

Incidentally, the concrete effects provided by the present invention are as follows.

It is possible to effect imaging in which various artifacts are remarkably reduced. In particular, it is effective in a reduction in various artifacts which might be derived from the complicate shape of body organs or the like.

The occurrence of various artifacts is suppressed, thereby enabling imaging with high resolution. It is possible to discriminate extremely small matter in a body organ such as an ear, a basilar portion or a lung.

An improvement in spatial frequency response enables achievement of proper-contrast imaging.

There is also an improvement in the standard deviation of a/reconstructed image of adjacent homogeneous media which reflects the influence of noise and an artifact and which serves as an index of uniformity. In particular, this effect is large in the case of high-resolution imaging of body organs.

Use of a simple data processing system enables high-speed processing.

While the above provides a full disclosure of the best mode for carrying out the invention, for ordinary persons skilled in the technical field to which the present invention belongs, it is easy to produce various modifications and variations without departing from the true spirit and scope of the invention.

I claim:

1. A method of carrying out tomography, comprising the steps of rotation a radiation source and a multichannel radiation detector about a subject to be examined, said radiation source being disposed so as to generate a fan beam of radiant rays, said multichannel radiation detector having an offset arrangement and being disposed in opposition to said radiation source with said subject being interposed therebetween;

applying said fan beam of radiant rays in a direction parallel with a chosen section of said subject;

measuring said chosen section of said subject in a plurality of directions parallel therewith so as to obtain data representative of a distribution of intensity of transmitted radiant rays;

obtaining measurement data in the form of an array corresponding to said fan beam in respective directions; and reconstructing a tomogram of said subject from said measurement data, wherein a set of data is obtained based on radiant ray beams advancing in an opposite direction along the same paths as those of radiant rays providing said measurement data, then the set of data is inserted between an adjacent corresponding set of measurement data prior to convolution or filtering to thereby increase the amount of measurement data, and then reconstructing an image using the increased amount of measurement data.

2. A method of carrying out tomography, comprising the steps of rotating a radiation source and a multichannel radiation detector about a subject to be examined, said radiation source being disposed so as to generate a fan beam of radiant rays, said multichannel radiation detector having an offset arrangement and being disposed in opposition to said radiation source with said subject being interposed therebetween;

applying said fan beam of radiant rays in a direction parallel with a chosen section of said subject;

measuring said chosen section of said subject in a plurality of directions parallel therewith so as to obtain data representative of a distribution of intensity of transmitted radiant rays;

obtaining measurement data in the form of an array corresponding to said fan beam in respective directions; and reconstructing a tomogram of said subject from said measurement data, wherein a set of data is obtained from data generated by interpolating between adjacent ones of data obtained based on radiant rays advancing in opposite directions as those of radiant rays providing said measurement data, and then inserting respective pieces of the set of data between an adjacent corresponding set of measurement data prior to convolution or filtering to thereby increase the amount of measurement data, and then reconstructing an image using the increased measurement data.

3. A method of carrying out tomography, comprising the steps of rotating a radiation source and a multichannel radiation detector about a subject to be examined, said radiation source being disposed so as to generate a fan beam of radiant rays, said multichannel radiation detector having an offset arrangement and being disposed in opposition to said radiation source with said subject being interposed therebetween;

applying said fan beam of radiant rays in a direction parallel with a chosen section of said subject;

measuring said chosen section of said subject in a plurality of directions parallel therewith so as to obtain data representative of a distribution of intensity of transmitted radiant rays;

obtaining measurement data in the form of an array corresponding to said fan beam in respective directions; and reconstructing a tomogram of said subject from said measurement data, wherein a set of data is obtained based on radiant ray beams advancing in an opposite direction along the same paths as those of radiant rays providing said measurement data, then the set of data is inserted between an adjacent corresponding set of measured data, and then the resulting increased measurement data is subjected to spatial frequency multiplication prior to convolution or filtering and then an image is reconstructed using the measurement data which has been subjected to the spatial frequency multiplication.

* * * * *